April 12, 1938. B. J. KLEERUP 2,113,845
FILM REWIND TAKE-UP
Filed July 1, 1936
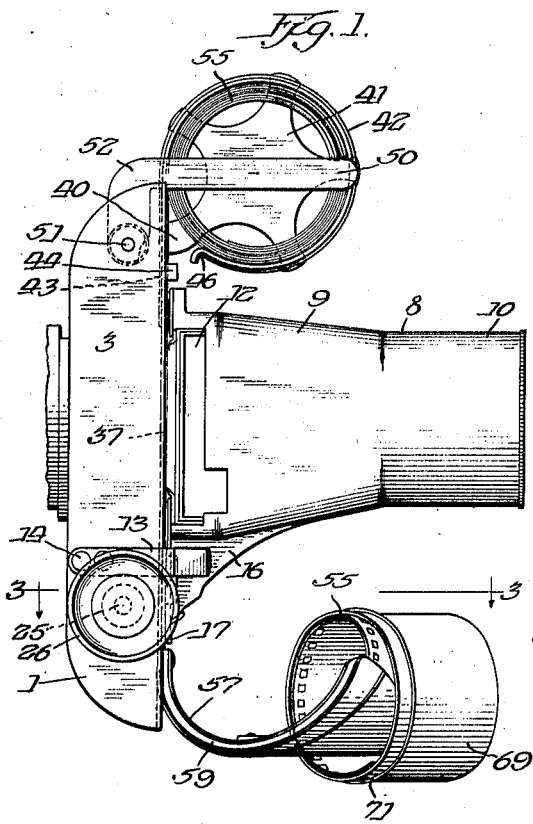
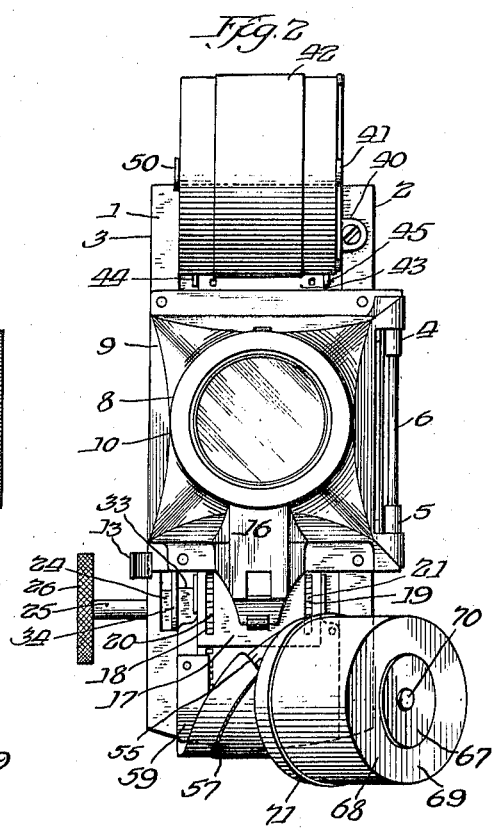
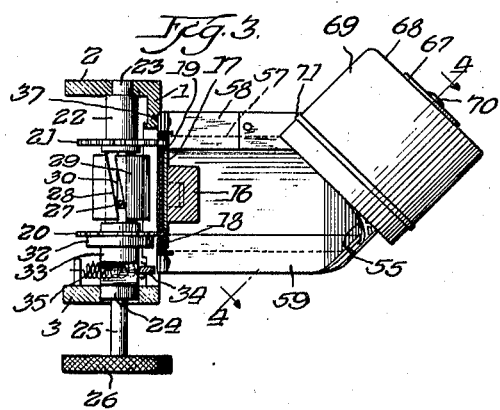
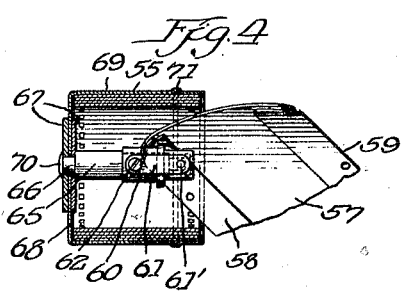
Inventor:
Bertel J. Kleerup,
By Paul Carpenter
Atty Patented Apr. 12, 1938

2,113,845

UNITED STATES PATENT OFFICE 2,113,845

FILM REWIND TAKE-UP

Bertel J. Kleerup, Chicago, Ill., assignor to Society for Visual Education, Inc., Chicago, Ill., a corporation of Delaware Application July 1, 1936, Serial No. 88,365

4 Claims. (Cl. 88—18.7)

This invention relates to projectors using lengths of film from which images are projected onto a screen or other suitable objective. More particularly, this invention relates to novel means for taking up, rewinding the film and depositing it in its container ready for reuse at the same time the film is being exhibited.

Many projectors, particularly the small portable types, are used for illustrated lectures, travel talks, school work and the like. Frequently the considerations of economy of both space and cost of equipment have reduced to a minimum the size and operative mechanism of the projectors. Such considerations have made it necessary to eliminate accessories and refinements.

In getting ready for the projection of a film, many handlings are required. The film is first taken out of its separate container and placed in the projector, and threaded through the film track in preparation for showing. After the projection of the lengthy film it is customarily necessary to rewind the film by either running it backward through the machine or taking it off of the projector and rewinding it on a special piece of equipment provided for that purpose. In all of these instances there are many handlings and the danger of scratching and tearing is ever present, causing irreparable damage to the film. Also, by running the film through backward in the projector to accomplish rewinding there is considerable wear and tear imposed both upon the projection apparatus which is operated at a high speed and on the film because of the dangers among others of scratching, breaking, tearing and the like. Furthermore, when running the film through at high speed the sprockets for feeding the film are apt to cause cracks at the edges of the sprocket holes and shorten the useful life of the film.

When a rewinder is used there is, of course, the expense of having such an accessory as well as the necessity for constantly having the device with the projector, thus decreasing the portability of the entire apparatus. By using such a device the dangers of scratching from dust and handling, which are the great destroyers of film, are by no means eliminated.

This invention has for an object the provision of a receiving container for the film which receives the film as it is exhibited. Another object is to provide such a container in which the film is received after being exhibited, rewound and ready for immediate reuse without the necessity of running the film back through the projector or using a separate rewinding mechanism. Still another object of this invention is the provision of a receiving container which may itself be easily and quickly removed from the projector upon completely receiving the film exhibited, rewound and ready for proper storage or transport without the necessity of any sort of additional handling. A still further object of this invention is the provision of a device which will take up the film as exhibited, rewind it ready for reuse, and deposit it in a removable container entirely eliminating any handling of the film itself and so eliminating the dangers which are so destructive to films. An additional object is the provision of a device which will accomplish the foregoing purposes among others in a simple effective manner by mechanisms which are simple and cheap and which when adapted to the ordinary projector will not appreciably increase the bulk or weight of the apparatus.

In general the structure embodying the invention contemplates the provision of a film guide which is curved as well as having the twist of a portion of a helix so that the film as exhibited will follow the track and conform to the curvatures. In this manner the guide or film track feeds the film into a receiving container in such a way that the film tends to coil on the inside cylindrical surface of the container and on the next preceding film coil as the film continues to be wound. By having this container freely rotatable on its axis the various coils of film as they are fed thereon adjust themselves with the physical properties of the film and tend to prevent relative movement between the contacting film surfaces, thus cutting down the danger of scratching by dust particles. Upon the completion of this feeding or rewinding operation into this receiving container, the film may be stored therein and not touched again until it is needed for projection.

My invention contemplates such other and further objects as will appear as the description of my invention and apparatus proceeds.

In attaining the foregoing objects together with such further benefits, advantages and capabilities as may hereafter appear and as are inherently possessed by my apparatus, I use the construction shown in the preferred form in the accompanying single sheet of drawings.

Referring to the drawing:

Figure 1 is a side elevation of the front portion of a projector embodying my invention.

Figure 2 is a front elevation thereof.

Figure 3 is a transverse section on the line 3—3 of Figure 1 looking in the direction of the arrows.

Figure 4 is a vertical section on the line 4—4 of Figure 3 looking in the direction of the arrows.

I contemplate the use of my invention with any type of continuous film projector but the one I have shown in fragment to illustrate my invention comprises a frame 1 of metal or any other suitable material having sides 2 and 3 bent over to form a generally U-shaped construction. Frame 1 at the front thereof has mounted thereon a pair of hinges 4 and 5 provided with a pivot pin supporting an objective lens housing 8. This objective lens housing has a generally pyramidal base 9 running into a cylindrical neck 10. Within this housing the suitable optical system for the objective lens is disposed. The base of the housing is a horizontal rectangular slot 12 cut through so that ordinary slides may be used for projection purposes if desired. The objective lens housing itself is maintained in close position by the spring catch 13 mounted by rivet 14 on the side 3 of the frame. The bottom of the objective lens housing 8 is provided with a tapering portion 16 which overlies and carries a feed cover plate 17 which assists in holding the film in proper position during projection. This cover plate 17 has spaced vertical slots 18 and 19 through which the teeth of the sprockets 20 and 21 for feeding the film project.

The film feed and driving mechanism will merely be generally described herein as it is more fully described and claimed in my co-pending application Serial Number 105,078, filed October 10, 1936. This film feed comprises two sprockets 20 and 21 carried on a spindle 22, provided with a reduced bearing portion 23 which is journalled into the side 2 of frame 1. The other end of the spindle has a portion 24 which is journalled in the side 3 of the frame 1. A rod 25 carrying knurled knob 26 is slidably mounted in the spindle 22 and carries a pin 27 which projects upwardly therefrom through the spindle 22 and between the spaced jaws 28 and 29. These jaws find a channel 30 pitched with respect to the axis of the entire feed system. In my mechanism which is more fully disclosed in the application above referred to, the longitudinal movement of the rod 25 causes pin 27 to travel axially between the sprockets and oscillate jaws 28 and 29 to control a suitable clutch of which the driven member comprises a drum 32 carrying a cam 33. The object of this mechanism is to provide a release to bring the frame of the film in proper register by merely pushing inward on the knurled knob 26 and releasing the brake by movement of the pin 27, and after the register has been obtained to hold that register by merely releasing the inward pressure on the knob 26. A cam follower 34 which is kept in place by spring 35 engages the cam 33, which assembly is adapted to control the proper advancement of successive frames of the film. Rotation of the knob 26 causes the teeth of sprockets 20 and 21 to engage the perforations on the film through the projector. In the normal operating transverse position of the rod 25, rotation of the sprockets will cause the drum 32 and the cam 33 to rotate therewith so that the film feed and control cam follower 34 are suitably synchronized. In the other position of rod 25 when framing adjustment is being made a rotation of the sprockets is independent of the drum 32 and cam 33, which remain stationary so that proper advancement of the film may result after framing is secured.

The frame 1 has as usual a portion thereof cut back at 37 to provide for the film track 44, 45 and 57, in line with the objective lens housing 8.

The upper portion of the frame 1 carries a bracket 40 terminating in a star shaped portion 41 which forms one side of the film magazine 5 and prevents the film to be projected from inadvertently being pushed out of the film magazine. The upper portion of the film track 42 has one end 43 rigidly fastened to the frame 1 and extends upwardly and is bent around to form an almost complete substantially cylindrical enclosure, thus forming the film magazine. The free end of this film track 46 is curved to prevent gouging or scratching the film. The film magazine has on the side opposite the attached star shaped portion 41 a movable film retainer arm 50 which is pivoted at 51 on the side 3 of the frame portion 1 and is adapted to be swung upwardly and backwardly in a vertical arc. It will be noted that the film retainer arm 50 as shown in Figure 1 is in position for operating the projector after the magazine has been loaded. The roll of film 55 disposed within the magazine as shown in Figure 1 may be placed therein by swinging the arm 50 upwardly on its pivot out of the way. The film is fed manually through the upper portion of the film track 42, which has ears 44 and 45 punched out therefrom to act as guards and guides for the film edge, down behind plate 17—it being understood, of course, that the objective lens housing 8 may be turned on its hinges to engage the teeth of the sprockets to start the film through the feeding mechanism—and then down to the lower portion of the film track 57. As the film is accepted, it is delivered to the lower film track 57, the upper portion of which is rigidly secured to the frame 1. The film track 57 is preferably made of metal although any suitable material may be used and has spaced marginal cover plates 58 and 59 which provide a slot through which the film is delivered and making it conform to the curvature and the helical twist of the track 57 for delivery to the container 69. As has been stated before, the lower portion of the film track is curved and at the same time is given a helical twist towards its end portion as is clearly shown by the drawing. Near the terminus of the film track 57 is a sleeve 60 whose axis is the section line 4—4 in Figure 3, and is preferably disposed at an angle of 45° to the axis of the film feed mechanism but in a horizontal plane as is shown in Figures 1 and 2. The sleeve 60 carries a spring clip 61 held by means of screws 62. The container 69, which takes up and rewinds the film at the same time after use, is cylindrical in shape and carries a pin or post 65 which is attached to the bottom portion 68 of the container 69 in any suitable manner. In Figure 4 the spaced washers 67 are shown as disposed on either side of the flat bottom 68 with the head 70 of the pin or post 65 flattened. Obviously the bottom 68 of the container 69 may be dished, or any other fastening means may be employed so that the bottom of the container 69 will present a surface such as will permit the container to stand firmly. The container 69 is preferably provided near the top edge with an annular ridge 71 for strengthening purposes as well as forming a stop against which the rim of the cover (not shown) rests. The container 69 is capable of ready attachment and detachment by inserting the free end of the post 65 through the sleeve 60 and is held in position by a button 61' carried by the spring clip 61, which button engages an annular groove at the top of post 65 and prevents lateral movement although permitting free rotation of the container and post. It will be seen that the entire container with its center post 65 is readily and freely rotatable within sleeve 60 and also that it is readily removable therefrom by its engaging the spring clip 61 and its button 61'. The diameter of the container is sufficiently larger than that of the helix so that clearance between the end of the film track and the inside of the container is obtained within which clearance the film may coil. Obviously if more clearance is needed for greater lengths of film the diameter of the container 69 may be increased accordingly.

As is evident from Figures 1 and 4, the film track 57 terminates with the side 58 well within the container and feeds the film 55 into the container 69 so that the coil is formed from the inside. At the time the first bit of film reaches the container it starts the container to rotate on its own axis and the first layer of film is placed directly within the inside wall of the container 69. Each succeeding layer of film as it is fed is placed near the center so that the last portion of the film displayed will be rolled nearest the center. As the film is delivered to the container 69 at an angle the film does not contact the side of the container or other film until it is laid or placed in its proper position in the container. It is evident that as the film 55 is fed downwardly it will form a reverse coil within the container 69. As soon as the entire roll has been fed into and wound in the container 69, the container and film may be removed from the sleeve 60 by merely releasing the clamping means 61. The film then is ready for immediate reuse in proper sequence and may be removed and placed in the magazine or retained in the container 69 and stored.

I claim:

1. In combination with a projector for continuous film, a guide for receiving projected film, said guide comprising a flat member having the side edges bent over to retain the film against said guide, said guide being twisted so that said film is bent into a helical shape, a film receiving container removably carried by the end of said guide and freely rotatable, said guide and container being so disposed relatively to each other that said film is fed into said magazine in such a way that said film tends to coil up in reverse manner.

2. The structure of claim 1, wherein said container is provided with a centrally disposed pin coming up from the bottom thereof, and wherein said guide has means for detachably and rotatively receiving said pin.

3. In combination with a continuous film projection machine, means for receiving projected film, said means comprising a guide secured at one end to said projection machine and bent to form a curve and twisted with its free end lying in a vertical plane at 45° to the plane of the other end of said guide, a receiving container rotatably and removably supported on the free end of said guide with its open end facing the free end of said guide and with the axis in said 45° plane for receiving said film as it issues from the guide inside of said container, said guide clearing and projecting into the inside of said container for permitting said film to form a reverse coil as it is deposited therein.

4. In combination with a continuous film projector, a guide for receiving the film after projection, a film receiving container into which said guide fits, a pin centrally disposed in said container, and spring means on said guide for removably and rotatably receiving said pin.

BERTEL J. KLEERUP.